May 29, 1945.    M. M. BURGESS    2,377,128
PREFORMING DIE
Filed June 23, 1942    3 Sheets-Sheet 1
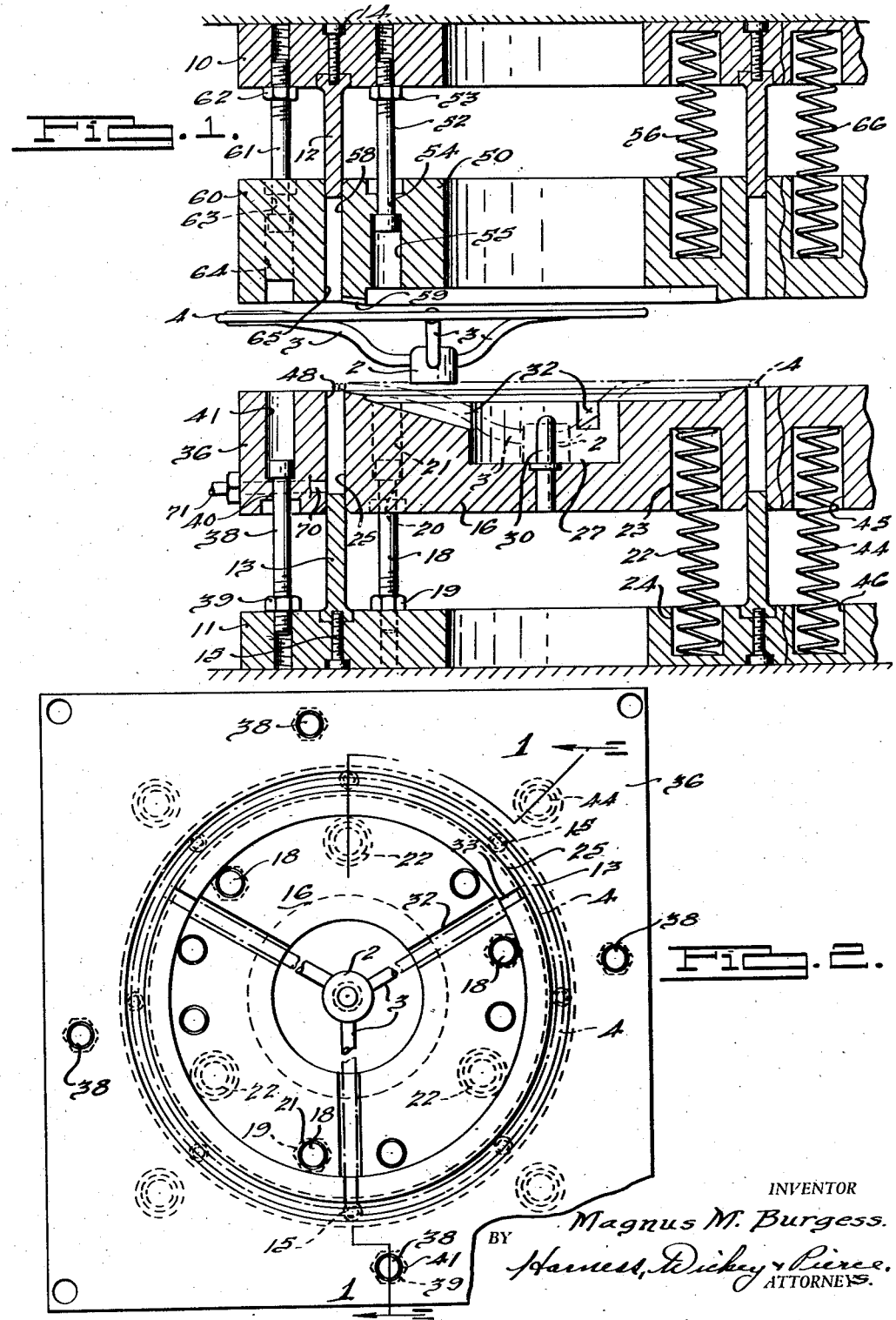
INVENTOR
Magnus M. Burgess.
BY Harness, Dickey & Pierce.
ATTORNEYS.

May 29, 1945.   M. M. BURGESS   2,377,128
PREFORMING DIE
Filed June 23, 1942   3 Sheets-Sheet 2

INVENTOR
Magnus M. Burgess.
BY
Harness, Dickey & Pierce.
ATTORNEYS.

May 29, 1945.  M. M. BURGESS  2,377,128
PREFORMING DIE
Filed June 23, 1942  3 Sheets-Sheet 3
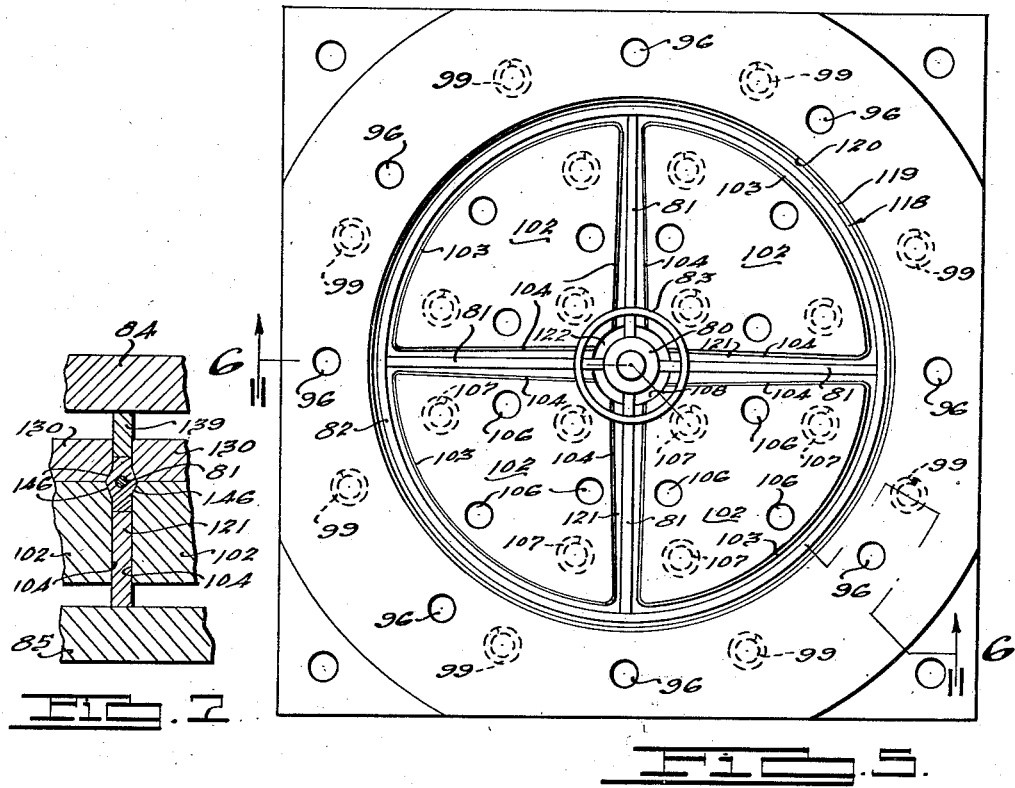
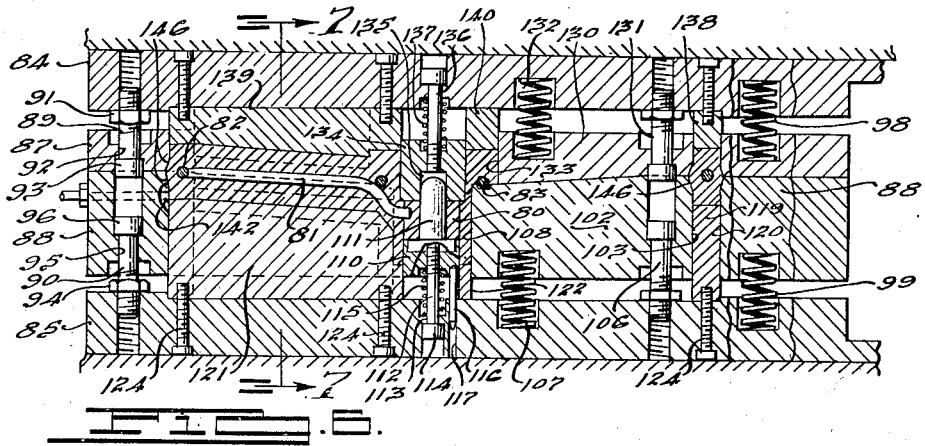
INVENTOR
Magnus M. Burgess.
BY
Harness, Dickey & Pierce.
ATTORNEYS.

Patented May 29, 1945

2,377,128

UNITED STATES PATENT OFFICE 2,377,128

PREFORMING DIE

Magnus M. Burgess, Detroit, Mich., assignor to Sheller Manufacturing Corporation, Portland, Ind., a corporation of Indiana Application June 23, 1942, Serial No. 448,079

5 Claims. (Cl. 18—36)

The present invention relates to the molding of so-called plastic materials about a supporting or reinforcing core. Such materials include, among others, thermoplastics, such as "Tenite," thermosetting materials, such as Bakelite, and cold molded materials, such as asphaltic compositions. The invention is particularly advantageous when applied to the preforming of such plastic materials around the core when the materials are supplied initially in a powdered or granular (i. e. particulated) form, but the invention may also be applied to plastics such as rubber which are supplied initially in the form of roughly shaped slabs or pieces.

It has been found desirable to preform such materials under pressure about the core-piece prior to the final molding operation in order to reduce waste by reducing or eliminating the flash which is formed during the final molding operation and also to evenly distribute the material about the core-piece prior to the final molding operation. If the plastic is particulated in form, sufficient pressure is employed to hold the particles of plastic material together until the article can be placed in the final molding press; in the case of uncured rubber, the pressure imparts a temporary form to the mass.

Hitherto it has been the practice, particularly in the molding of annular members, such as vehicle steering wheels, from particulated material to preform the plastic material in two separate pieces, each of which is adapted to envelop half of the core of the steering wheel rim. When this practice is followed, the core-piece and the two sections of pre-molded material are assembled in proper position in the molding press for the final molding operation. While this practice eliminates waste and results in an even distribution of the material, it is found that the mating surfaces of the two pre-molded sections of plastic material do not bond properly due to the formation of a glazed, partially set condition on the surfaces of the sections during the pre-holding operation.

It is a general object of the present invention to provide an apparatus of performing plastic material entirely around a core-piece in a single operation in order to overcome the above mentioned disadvantages, and, more specifically, such an apparatus and method which are especially advantageous when applied to a particulated plastic material.

A more specific object of the invention is to provide such an apparatus adapted to preform plastic material entirely around an annular core member, such as the rim of a steering wheel.

Another object of the invention is to provide an apparatus adapted to preform plastic material entirely around not only the annular rim core of a vehicle wheel, but also the spokes and hub of the wheel in a single operation.

A still further object is to provide an apparatus of the type mentioned which is effective even though the particulated plastic material employed is reduced many times in volume during the preforming operation.

Other objects, which include the provision of an apparatus of the type mentioned which is rapid and fool-proof in its operation, will become apparent from the following specification, the accompanying drawings, and the appended claims.

In the drawings, in which like numerals are used to designate like parts in the several views throughout:

Figure 1 is a vertical section through a suitable die mechanism for use in carrying out the invention, showing the die members in their fully open position. The section is taken on the irregular line I—I of Figure 2;

Figure 2 is a plan view of the lower half of the die mechanism;

Figure 5 is a plan view similar to Figure 2 of the lower half of a modified form of die mechanism;

Figure 6 is a sectional view taken on line 6—6 of Figure 5, showing the modified form of die mechanism in partially closed position; and Figure 7 is a fragmentary section taken on the line 7—7 of Figure 6.

Figure 3:
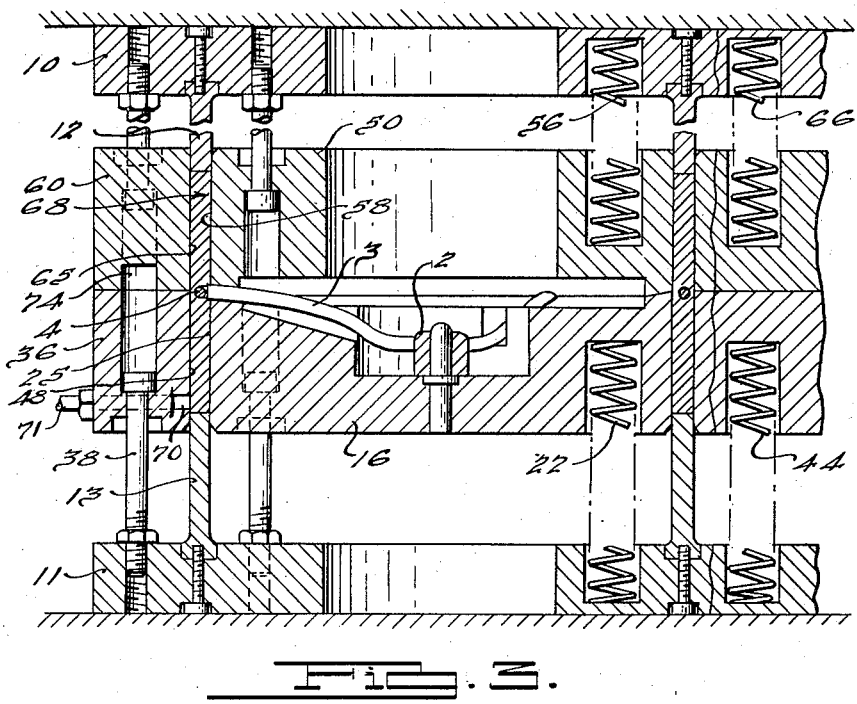
Figure 3 is a sectional view corresponding to Figure 1, showing the die members in a partially closed position.

In the drawings is illustrated a suitable die mechanism embodying the invention and adapted to preform a plastic material about the annular rim of a vehicle steering wheel. The steering wheel comprises a hub 2, three radially extending spokes 3, and an annular rim 4 which constitutes the core about which the plastic material is to be preformed.

As best shown in Figures 1 and 2, the die mechanism includes a pair of supporting members 10 and 11 adapted to be secured to the relatively moving members of any suitable form of press. Secured, respectively, to the supporting members 10 and 11 are a pair of annular plungers 12 and 13 which are secured in annular slots in the members in any suitable manner, such as by cap screws 14 and 15, for projection toward each other.

A die member 16 has a lost motion connection with the lower supporting member 11 through three cap screws 18, which are threaded into suitable tapped openings in the supporting member 11 and locked into position by means of lock nuts 19. Cap screws 18 extend through suitable bores 20 in the die member 16, and the heads of the cap screws are adapted to slide in counterbores 21 in the upper ends of the bores 20. The die member 16 is constantly urged away from the supporting member 11 by three springs 22 equally spaced about the periphery of the die member 16 and seated in the bores 23 and 24 in the die member and supporting member, respectively.

The outer surface 25 of the die member 16 is cylindrical in contour and is adapted to have a sliding fit within the annular plunger 13.

The central portion of the die member 16 is provided with a central recess 27 and a central spindle 30 projecting upwardly from the bottom of the recess and adapted to receive the hub 2 of the steering wheel in the manner shown in dotted lines in Figure 1. When the steering wheel is positioned on the stud 30, its spokes 3 project outwardly through radial grooves 32 formed in the upper surface of the die member 16. The outer ends of the grooves 32 are reduced, as shown at 33, in order to closely fit the spokes and thus prevent flow of the plastic material through the grooves during the preforming operation.

A second die member 36 is also connected to the lower supporting member 11 by a lost motion connection comprising four cap screws 38, which are threaded into suitable tapped openings in the supporting member 11 and locked into position by means of lock nuts 39. The shanks of the cap screws 38 have a sliding fit in bores 40 in the die member 36, which bores are countersunk at 41 at their upper ends to receive the heads of the cap screws. The die member 36 is normally urged away from the supporting member 11 by four springs 44 having their ends seated in suitable bores 45 and 46 in the die member and supporting member, respectively. The inner surface 48 of the die members 36 is cylindrical in contour and is adapted to have a sliding fit with the exterior surface of the annular plunger 13.

The upper supporting member 10 carries an inner die member 50, which is similar in construction to the inner die member 16 except that it lacks the wheel supporting means. Die member 50 is likewise provided with a lost motion connection with the supporting member 10, such connection comprising cap screws 52 threaded into suitable tapped openings in the supporting member 10 and locked into position by lock nuts 53. The cap screws 52 have a sliding fit in bores 54 in the die member 50, and the bores 54 are provided with countersunk lower ends 55 to receive the heads of the cap screws 52. Three equally spaced springs 56, similar in construction and arrangement to the springs 22, normally urge the die 50 downwardly with respect to the supporting member 10. The outer surface 58 of the die member 50 is cylindrical in form and is adapted to have a sliding fit within the annular plunger 12. The lower portion of the die 50 is provided with three radially distributed grooves 59 adapted to receive and fit the upper portions of the spokes 4 when the die members are closed.

The supporting member 10 also carries an outer die member 60, similar to the die member 36 and having a lost motion connection with the supporting member 10, such connection comprising studs 61 threaded into suitable tapped holes in the supporting member 10 and locked into position by lock nuts 62. The cap screws have a sliding fit in bores 63 in the die member 60, which bores at their lower ends are countersunk at 64 to receive the heads of the cap screws 61. The inner surface 65 of the die member 60 is cylindrical in form, and is adapted to have a sliding fit on the outer surface of the annular plunger 12. Four springs 66, constructed and arranged in the manner of springs 44, are located between the supporting member 10 and the die member 60 and serve to urge the die member 60 into spaced relation to the supporting member 10.

It will be apparent that with the construction so far described when the supporting members 10 and 11 are fully separated, as shown in Figure 1, the heads of the cap screws 18, 38, 52 and 61 engage the bottoms of the countersunk openings in which they fit and cause a separation of the die members 16 and 50, on one hand, and 36 and 60, on the other, in spite of the action of springs 22, 44, 56 and 66, tending to force the die members toward each other. The parts are so arranged that upon such full separation, sufficient space will be provided between the die members to permit insertion of the wheel or other core member in the manner shown in solid lines in Figure 1. The final position of the wheel or core member is illustrated in dotted lines in Figure 1.

After the core of the steering wheel frame is placed in the position illustrated in dotted lines in Figure 1, the press is operated to cause the supporting members 10 and 11 to move toward each other until the lower inner die 16 contacts the upper inner die 50 and the lower outer die 36 similarly contacts the upper outer die 60, which position of the parts is illustrated in Figure 3. It will be observed that during this movement the springs 22, 44, 56 and 66 hold the various die members in their fully spaced relation to their supporting members, with the result that there is little or no relative movement between the plungers 12 and 13 and the die members in contact with them. Such closing of the die members forms a closed annular chamber, indicated generally at 68, the inner side wall of which is formed by the cylindrical surfaces 25 and 58 of the die members 16 and 50, respectively, and the outer side walls of which are formed by the cylindrical walls 48 and 65 of the die members 36 and 60, respectively. The bottom wall of the annular chamber is formed by the end of the annular plunger 13, while the top wall is formed by the end of the annular plunger 12. Since the spokes 3 have a close fit with the grooves 33 and 59 in die members 16 and 15, respectively, the annular chamber is entirely closed and the core or rim 4 is positioned centrally of the chamber.

Figure 4:
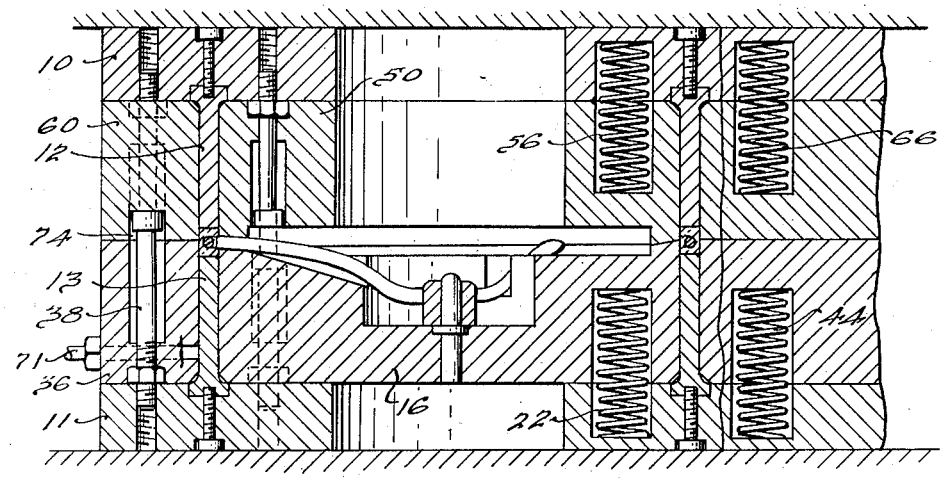
Figure 4 is a similar vertical section, showing the die members in their fully closed position.

With the parts in the position illustrated in Figure 3, the press is stopped and the closed annular chamber 68 is filled with particulated plastic material by injecting the material in any suitable manner through an opening 70 which is connected in any suitable manner, as by a flexible pipe or hose 71, to a source of supply. When a measured quantity of material sufficient to completely fill the closed annular chamber 68 is injected into the chamber, the operator knows that the entire chamber is filled and that the material is equally distributed around the annular core or rim 4. Thereupon the press is operated to further move the supporting members 10 and 11 toward each other to the fully closed position illustrated in Figure 4. It will be observed that during this final closing movement the springs 22, 44, 56 and 66 are compressed and the die members positively abut against the supporting members 10 and 11. Since this final closing movement in the particular construction illustrated is greater than the length of the counterbores 21, 41, 55 and 64, the studs 18 are offset circumferentially with respect to the studs 52, and the studs 38 are likewise offset from the studs 61 and pockets are provided for the reception of the heads of these studs in the final closing movement. As best shown in Figures 3 and 4, the heads of studs 38 project into pockets 74 in the die member 60 when the parts are in their fully closed position. The heads of the remaining studs project into similar pockets.

It should be noted that during the first part of the final closing movement the opening 70 is closed by the annular plunger 13, thus preventing return flow of the plastic material through the opening.

The particular mechanism illustrated in Figures 1 to 4, inclusive, is designed for use with a particulated plastic material which is greatly reduced in volume during the preforming operation. It will be obvious, however, that the proportions of the parts, and in particular the stroke of the plungers, may be reduced or increased to accommodate materials having less or greater degrees of compression.

During the final preforming movement, the weight of the die members 16, 36, 50 and 60 is supported by the springs 22 and 44. Preferably, the springs 22 and 44 are made substantially stiffer than the springs 56 and 66, so that the former will overcome the compressive force exerted by the latter and hold the die members substantially midway between the supporting members 10 and 11 during the final preforming movement, since by that means the plungers 12 and 13 will be caused to move simultaneously and at the same rate toward the annular core 4. Sufficient pressure is applied to temporarily bond the particles of material together, the bond being merely sufficient to permit handling of the bonded core between the preforming press and the final molding press.

The modified form of the invention shown in Figures 5 and 6 is similar in principle of operation to that illustrated in Figures 1 to 4, inclusive, but it is adapted not only to mold plastic materials around the rim of a steering wheel frame but also, at the same time, about the spokes and hub portion, in consequence of which the die members are differently shaped from those previously described and additional plungers are provided.

As shown in Figures 5 and 6, the frame or core of the steering wheel includes a hub sleeve 80, four radially extending spokes 81, a rim 82, and an inner reinforcing ring 83 connecting the spokes adjacent the hub; and the die mechanism is adapted to preform plastic material entirely about all portions of the frame or core except the top and bottom extremities of the hub sleeve 80. As in the previous form of the invention, the die mechanism includes a pair of supporting members 84 and 85, to which are attached by a lost motion connection a plurality of die members and to which are fixed specially formed plungers.

In this form of the invention, the die members include a pair of annular outer die members 87 and 88 connected, respectively, to the supporting members 84 and 85 by means of a plurality of studs 89 and 90. The studs 89 are threaded into suitable openings in the supporting member 84 and are locked into position by lock nuts 91. The shanks of these studs extend through suitable openings 92 in the upper annular die member 87, and are provided with enlarged heads 93 adapted to slide in the lower counterbored portions of the openings 92. The studs 90, which connect the lower die member 88 to the lower supporting member 85, are threaded into suitable openings in the supporting member 85 and are locked into position by lock nuts 94. The shanks of the studs 90 project through openings 95 in the annular die member 88 and enlarged heads 96 on the studs slide in the upper counterbored ends of the openings 95. It will be noted that the counterbored portions of the openings 92 and 95 are in alignment, so that when the die members 87 and 88 are closed upon each other, in the manner shown in Figure 6, the head 93 of stud 89 may project downwardly into the counterbore of opening 95. The annular die members 87 and 88, which extend entirely around the mechanism, are normally held in spaced relation to the supporting members 84 and 85 by means of a plurality of springs 98 and 99.

Secured to the lower supporting member 85 by a similar lost motion connection are four generally sector-shaped die members 102, each having an arcuate surface 103 concentric with the inner surface of the annular die member 88 and spaced from it and a pair of substantially radial surfaces 104, whose planes lie along the sides of the spokes in slightly spaced relation. Each of the sectors 102 is connected with the lower support 85 by three studs 106 and three springs 107, in the manner described in greater detail in connection with the outer annular die member 88. The apex of each sector 102 is slightly cut away to form a curved surface 108 which lies in spaced relation to the hub 80 of the wheel frame or core.

The wheel is supported in position in the die member by a cylindrical supporting element 110 having an integral locating pin 111, which is adapted to fit the interior opening of the hub 80. The cylindrical supporting member 110 has a lost motion connection with the lower supporting member 85, comprising a stud 112, which is screwed into the bottom of the supporting member 110 and extends through a suitable bore 113 in the supporting member 85. An enlarged head 114 on the stud limits upward movement of the wheel supporting member 112, and a coil spring 115 surrounding the stud normally holds the wheel supporting member 110 in spaced relation to the lower supporting member 85. A guide pin 116 is fixed at its upper end to the wheel supporting member 110, and is adapted to slide in a suitable bore 117 in the supporting member 85. The guide pin 116 prevents rotation of the wheel supporting member 110, and thus insures that the spokes of the wheel will be properly located in the die recesses during the performing operation. It will be noted that the outer surface of the wheel supporting member 110 is spaced from the inner arcuate surface 108 of the sector-shaped die members 102.

It will be observed that the spaces between the members 88, 102 and 110, as viewed in Figure 5, define inner and outer concentric circles connected by four radial hubs. Consequently, there is provided on the lower die member a plunger, indicated generally at 118, which is of a shape to fill those spaces. The plunger 118 thus includes an annular portion 119, which fills the space between the outer arcuate surfaces 103 of the sector-shaped die members 102 and the inner arcuate surfaces 120 of the outer annular die 88. The plunger 118 also includes four radially extending portions 121, which fill the spaces between the radial side walls 104 of the sector-shaped die members 102; and the plunger 118 further includes an inner annular portion 122, which fills the spaces between the wheel supporting member 110 and the inner arcuate surfaces 108 of the die members 102. The entire plunger 118 is fixedly secured to the lower supporting member 85 by a plurality of cap screws 124.

The inner die mechanism mounted upon the upper supporting member 84 is similar to that just described with reference to the lower supporting member 85, and includes four inner die members 130 having the same sector-shape as the die members 102 and connected to the upper supporting member 84 by a lost motion connection including studs 131 and springs 132. In addition, there is provided a central cylindrical die element 134 having an axial bore 135 to receive the upper end of the pin 111. The lower surface of the die member 134 rests upon the upper end of the hub sleeve 80 when the die members are closed in the manner shown in Figure 6.

The die element 134 likewise has a lost motion connection with the hub supporting member 84 comprising a stud 136 and a spring 137.

The die members 87, 130 and 134 are similar in shape and arrangement to the corresponding die members 86, 102 and 110 mounted on the lower supporting member 85, except that the inner arcuate surface 133 of the sector-shaped die members 130 is of larger radius than the corresponding surfaces 108 on the sector-shaped die members 102 in order to provide room for the reinforcing ring 83 of the steering wheel frame. It will be observed that, as shown in Figure 6, the reinforcing ring 83 rests upon the upper inwardly projecting surfaces of the sector-shaped die members 102 when the parts are in the position shown. This facilitates location of the rim 82 but, if desired, a clearance may be provided between the reinforcing ring 83 and the die members 102.

The upper supporting member 84 also includes a plunger which is of the same shape and arrangement as the plunger 118 and which includes an outer annular portion 138, four radially extending portions 139, and an inner annular portion 140, the latter being of greater width than the corresponding inner annular portion 122 on the lower plunger 118 due to the greater space between the surface 133 and the periphery of the die member 134.

The operation of the modified form of die mechanism will be obvious from the description of the operation of the form of die mechanism shown in Figures 1 through 4. The supporting member 84 and 85 are first separated from the position shown in Figure 6 in order to provide room between the die members for insertion of the steering wheel frame or core. During such operation, the heads on the various studs cause a separation of the work holding die element 110 from the die element 134, a separation of the die elements 102 from the die elements 130, and a separation of the annular die elements 88 from the die elements 87, in spite of the action of the springs tending to force such die elements together.

After the steering wheel frame is placed in position, the supporting elements 84 and 85 are closed in the position shown in Figures 5 and 6 and the plastic material is injected through an opening 142, shown at the left-hand side of Figure 6. From this point the material fills all of the die spaces, as indicated by the broken cross-hatch lines. If necessary, additional openings may be provided to facilitate filling the die spaces.

After the die is filled with plastic material, the supporting elements 84 and 85 are moved toward each other until the plastic material is fully compressed, such closing movement being accompanied by a compression of the springs 98, 99, 107, 115, 132 and 137. This final closing movement compresses the plastic material about the rim, spokes and hub sleeve of the steering wheel frame or core. In addition, it will be observed that it compresses a body of plastic partially around the reinforcing ring 83. The only point at which the reinforcing ring 83 will not be surrounded by plastic is at that portion at which it contacts the sector-shaped die members 102. There will, however, be sufficient plastic in the general vicinity of the supporting ring 103 to completely envelop the ring in the final molding operation.

It will be noted that the mating edges of the various pairs of die members 87—88 and 102—130 are slightly beveled, as indicated at 146, in order to facilitate separation of the die members and removal of the preformed material. During the preforming operation the plungers do not advance into overlapping relation with respect to the beveled surfaces, the parts being so designed that the closing movement of the press is blocked when the plungers reach the edge of the beveled surface.

It will be noted that there is less compression of the plastic material provided for in the die mechanism of Figures 5 to 7, inclusive, than in the die mechanism illustrated in Figures 1 through 4. The difference is accounted for by the fact that the modified form of die mechanism was designed for use with a plastic which did not have as high a ratio of compression during the preforming operation as the particular plastic intended for use in the die mechanism of Figures 1 through 4.

It will be understood that if either form of apparatus disclosed herein is employed in premolding a plastic material, such as rubber, which is supplied in roughly shaped slabs or pieces rather than in particulated form, the plastic material will be inserted in the die recesses at the same time that the core piece is inserted, i. e. while the die members are fully separated.

Use of the apparatus and employment of the method described herein makes it possible to quickly and easily preform exactly the right amount of plastic material entirely about the core-piece and to equally distribute that material so that a minimum amount of flow of material will occur during the final molding operation. In consequence, the final molded product is stronger and more uniform in its properties and all waste is eliminated.

It is apparent that various modifications may be made in the apparatus and method described above without departing from the spirit of the invention or the scope of the appended claims.

What is claimed is:

1. A preforming die for compressing plastic material around a core member including a pair of supporting members movable toward and away from each other, means adapted to form a closed chamber for reception of the core and material, said means including a pair of mating upper and lower side wall forming members located between the supporting members and a pair of plungers fixed respectively to said supporting member and forming the top and bottom walls of the chamber, resilient means for forcing each mating member away from its adjacent supporting member and toward the other mating member, a lost motion connection between each mating member and its adjacent supporting member to permit limited movement of the mating member toward and away from the supporting member whereby on full separation of the supporting members the mating members will be separated from each other to permit insertion of a core member and on partial movement of said supporting members toward each other said mating members will contact each other and close the chamber without any movement of either mating member with respect to the supporting member to which it is connected, means on one of said mating members to support the core member in spaced relation to the walls of the chamber, said chamber having an aperture to permit injection of said material when the chamber is closed, said lost motion connection permitting said supporting members and plungers to move toward each other and compress the material around the core after the mating members contact and close the chamber.

2. A preforming die for compressing plastic material around an annular core member including a pair of supporting members movable toward and away from each other, means adapted to form a closed annular chamber located between said supporting members for reception of said core, said means including a pair of mating upper and lower members adapted to define the inner side wall of said annular chamber, a pair of mating members adapted to define the outer side wall of said annular chamber, and a pair of plungers movable toward each other with said supporting members and defining the top and bottom walls of said chamber, a lost motion connection between each of said supporting members and the adjacent one of each of said pairs of mating members to cause separation of said pairs when said supporting members are fully separated, resilient means to cause said mating members to contact each other and close said chamber when the supporting members are moved partially toward each other, said lost motion connection permitting said supporting members and plungers to move toward each other and compress the material around the core after the mating members contact and close the chamber.

3. A preforming die for compressing particulated material around an annular core member including a pair of supporting members movable toward and away from each other, means adapted to form a closed annular chamber located between said supporting members for reception of said core, said means including a pair of mating upper and lower members adapted to define the inner side wall of said annular chamber, a pair of mating members adapted to define the outer side wall of said annular chamber, and a pair of plungers fixed respectively to said supporting members and defining the top and bottom walls of said chamber, a lost motion connection between each of said supporting members and the adjacent one of each of said pairs of mating members to cause separation of said pairs when said supporting members are fully separated, resilient means to cause said mating members to contact each other and close said chamber when the supporting members are moved partially toward each other, means on one of said mating members to support the core member in spaced relation to the walls of the chamber, said chamber having an aperture to permit injection of said material when the chamber is closed, said lost motion connection permitting said supporting members and plungers to move toward each other and compress the material around the core after the mating members contact and close the chamber.

4. A preforming die for compressing particulated material around the rim of a spoked wheel including a pair of supporting members movable toward and away from each other, means adapted to form a closed annular chamber located between said supporting members for reception of said wheel rim, said means including a pair of mating upper and lower members adapted to define the inner side wall of said annular chamber, a pair of mating members adapted to define the outer side wall of said annular chamber, and a pair of plungers fixed respectively to said supporting members and defining the top and bottom walls of said chamber, a lost motion connection between each of said supporting members and the adjacent one of each of said pairs of mating members to cause separation of said pairs when said supporting members are fully separated, resilient means to cause said mating members to contact each other and close said chamber when the supporting members are moved partially toward each other, means on one of said pair of inner side wall mating members to engage the wheel and support the same with the rim in spaced relation to the walls of the chamber, said chamber having an aperture to permit injection of said material when the chamber is closed, said lost motion connection permitting said supporting members and plungers to move toward each other and compress the material around the core after the mating members contact and close the chamber.

5. A preforming die for compressing plastic material about the rim, spokes and hub of a spoked wheel including a pair of supporting members movable toward and away from each other, means suspended between and having a lost motion connection with said supporting members and adapted to form a closed chamber of a shape corresponding to the shape of the wheel, said means including co-operating members defining the side walls of said chamber, said side walls lying parallel to the path of relative movement of said supporting members and along both the inner and outer sides of the rim, both sides of each spoke and the outside of the hub of the wheel, a pair of plungers carried respectively by said supporting members and projecting toward each other and into the space between said side walls, said plungers being of a size and shape to fill the space between said side walls and being adapted when the supporting members move toward each other to move toward the wheel and each other and compress plastic material toward and around the rim, spokes and hub and means for supporting the wheel in said chamber in spaced relation to said walls, said last mentioned means including springs acting against the supporting members for holding the wheel in spaced relation to both plungers as the plungers move toward each other.

MAGNUS M. BURGESS.